HAYDN M. BAKER, OF WASHINGTON, DISTRICT OF COLUMBIA.

Letters Patent No. 86,200, dated January 26, 1869.

IMPROVEMENT IN THE MANUFACTURE OF SULPHURIC AND HYDROCHLORIC ACIDS.

The Schedule referred to in these Letters Patent and making part of the same.

*To all whom it may concern:*

Be it known that I, HAYDN M. BAKER, of Washington, in the District of Columbia, have invented a new and useful "Process for the Manufacture of Sulphuric and Hydrochloric Acids from Sulphurous Acids, Chlorine-Gas, and Water;" and that the following is a full and exact description thereof.

This invention is partly dependent upon another, styled "a process for the manufacture of sulphur and chlorine-gas from sulphurous and hydrochloric acids," because, to make it valuable, the chlorine must be produced at a moderate cost.

It is based upon certain reciprocal chemical actions of chlorine, sulphur, and sulphurous and hydrochloric acids, with and without the presence of water.

The reactions relating to the manufacture of sulphuric and hydrochloric acids would be represented by the following equation:

$Cl\ SO_2$ and $HO$ become $SO_3$ and $H\ Cl$.

To make use of this invention one may provide himself with suitable apparatus for generating sulphurous acid by any of the known methods which may be considered economical, and then generate chlorine-gas by my process explained in the description of the invention hereinbefore alluded to, or by any other method, if thought more economical.

After having procured two equivalents of the gases, (one equivalent of each,) they may be passed through a series of glass condensers, made like nitric-acid condensers, with a jet of steam.

Glass-ware is most proper for condensation and reactions, because light facilitates both the formation of hydrochloric and sulphuric acids from the elements or compounds concerned. It is necessary to have an excess of steam, which unites with the sulphuric acid, as fast as same is produced, forming a hydrate of sulphuric acid. The entire condensed liquid is now placed in glass retorts, and the muriatic acid distilled off, and when the sulphuric acid is sufficiently concentrated, it may repose until cooled, and then be drawn into carboys in the usual well-known way.

The advantages of this invention are that it affords an economical method for the oxidation of sulphurous acid, without the use of nitric acid or nitrate of soda, and at the same time gives an acid sufficiently concentrated for nearly all commercial purposes, while the hydrochloric acid recovered may be reconverted into chlorine-gas for future operations.

*Claim.*

What I claim as my invention, and desire to secure by Letters Patent, is—

The use of chlorine-gas and water for the purpose of oxidizing sulphurous acid, to form sulphuric and hydrochloric acids, in the manner herein described and fully set forth.

HAYDN M. BAKER.

Witnesses:
JOHN B. CLARK, Jr.,
R. H. MARSH.